April 19, 1966 H. PRÖGLER 3,246,789
STORAGE CONTAINER FOR LIQUEFIED GASES
Filed Oct. 23, 1963 3 Sheets-Sheet 2
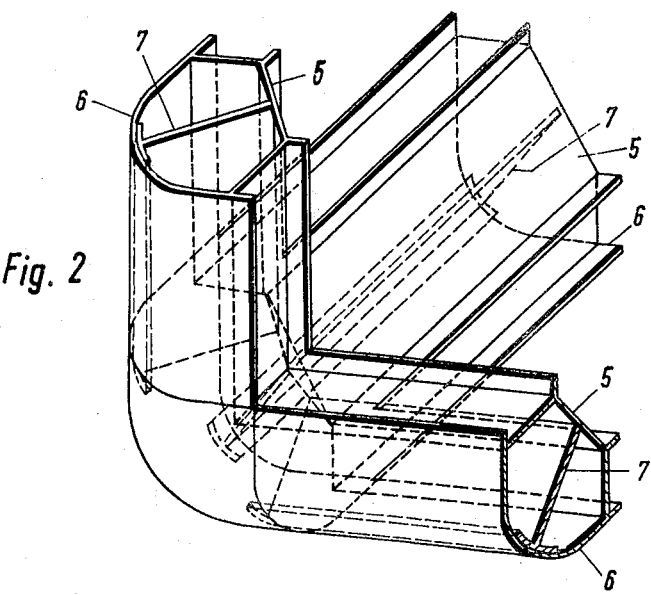
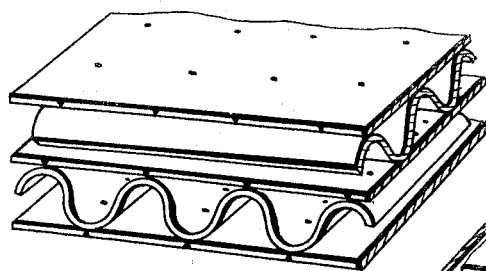
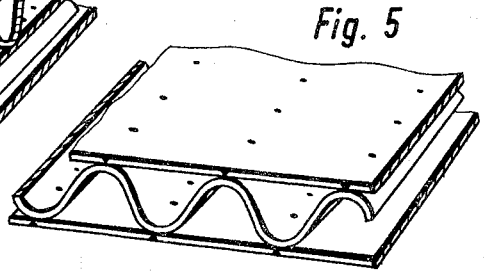
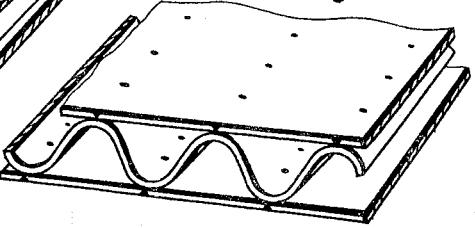
Inventor
HANS PROGLER
By Toulmin & Toulmin
Attorneys April 19, 1966     H. PRÖGLER     3,246,789
STORAGE CONTAINER FOR LIQUEFIED GASES
Filed Oct. 23, 1963     3 Sheets-Sheet 3

Inventor
HANS PROGLER
By Toulmin & Toulmin
Attorneys

3,246,789
STORAGE CONTAINER FOR LIQUEFIED GASES
Hans Prögler, Trostberg, Germany, assignor to Gesellschaft fur Linde's Eismaschinen Aktiengesellschaft, Hollriegelskreuth, near Munich, Germany
Filed Oct. 23, 1963, Ser. No. 318,343
Claims priority, application Germany, Nov. 2, 1962,
G 36,304
8 Claims. (Cl. 220—15)

This invention relates to containers for the storage and transportation of liquefied gases.

Heretofore liquefied gases have been stored in variously shaped containers, such as cylinders, spheres, prisms, and cubes. All of these known container configurations have a common feature in that they consist of a single wall of sheet material which is surrounded by a layer of heat insulation and/or a vacuum space. The insulated space is surrounded on its outside by a second container which, however, is not brought into direct contact with the liquid. Such containers are generally rigid structures. Tanks for use on ships sometimes have the container itself made of thermoelastic material, but always of just a single wall of thin sheet material. Both the rigid and the elastic containers are stiffened by reinforcing structures either inside or outside the containers.

The main object of this invention is to produce storage containers for liquefied gases, especially for marine use, with better protection against leakage.

The solution of this problem consists in forming the walls of the container of at least two parallel sheet metal walls which have been closely welded and with a spacing of 20 to 300, and preferably 100 to 200 mm. maintained between them by welded reinforcing ribs at regularly spaced intervals, while the outer wall is covered by a layer of thermal insulation to prevent the transfer of heat.

The double or multiple layer wall is to be used as a substitute for the impervious layer (usually of sheet aluminum) required in the insulation spaces of tankers.

The weblike spacers between the two sheet metal walls are spaced from one another in such a manner that the container walls will have the required mechanical stability.

The wall elements of the storage container are so constituted that they will have the required stability at all points to make it possible for them to be joined to a double or multiple layer wall.

The construction of the wall profile can assume various forms. In a preferred form the two sheet metal walls are assembled from individually extruded forms, preferably welded together. The extrusion profiles consist advantageously of two flanges formed along longitudinal webs, the flanges being welded to each other along their lengths.

In another form of this invention the container walls consist of at least two parallel sheet metal walls spaced 20 to 300 mm. and preferably 100 to 200 mm. apart, which have been joined to one another by means of interposed zigzag or corrugated sheets by roller or spot welding or soldering to form a unitary structure. Automatic welding or soldering methods can be used for this purpose.

The arrangement and positioning of the webs or corrugations relative to the wall can be optional. With unidirectional stresses the wall elements should have their webs or corrugations positioned in such a manner that they will offer the greatest resistance to pushing, pulling or bending.

Constructions with zigzag or corrugated profiles are also suitable for two-directional loads. In this case the container walls are preferably formed of three parallel sheet metal walls spaced 20 to 300 mm., and preferably 50–200 mm. from one another, and which are formed into a unitary structure by interposed zigzag or corrugated sheets which have been joined by roller or spot welding or soldering in such a manner that the webs or corrugations of the inner and outer interposed layers are at right angles to each other.

According to another feature of this invention the cells which are formed between the inner and outer walls of the container by the corrugations of the sheet metal are sealed off air-tight either individually or in groups, and are provided with pipe connections for inert gas. These pipe connections can also be used for testing the container for gas-tightness, and they also serve to admit gas into the hollow walls during the cooling-off to compensate for lowering of the gas pressure therein.

As an inert gas for introduction into the hollow walls, a gas with low thermal conductivity should be selected. The hollow walls can also be flushed with an inert gas followed by a gas analysis to test the container for possible leakage.

The lowering of the gas pressure in the hollow walls can also be ascertained by measurements of the tank walls.

Since a leak in the inner wall can establish communication and equalization of gas pressure with only one cell or with a single group of cells, such separation of the airspace into separate cells will make it easier to locate any leaks that may be present.

For marine tankers as well as for transportable tanks it is of importance in this invention that the container walls, which consist of at least two sheet metal walls held in spaced relation by transverse webs, be braced by walls extending transversely through the container. Such bracing walls can be substituted by lattice structures, although such bracing walls have the advantage of suppressing turbulence during stormy seas.

In order to make the best possible use of the available space, the storage container can be given a prismatic form, is provided with a dome, and the edges of its inner walls joined by 45° angle strips, while the edges of its outer walls are joined by concavo-convex strips, the corner strips being joined to each other by longitudinal webs while the side walls of the container are braced by vertical walls extending longitudinally and transversely through the container and welded to the inner side walls.

The walls which subdivide the container are preferably joined to one another by being welded along their intersection to a cross-shaped junction strip. It is also advisable to weld these walls to the bottom floor, at least at intervals. The upper edges of these walls are preferably spaced from the cover of the container sufficiently to permit free movement of the gases from one compartment to another, while along their lower edges they may be provided with perforations to ensure equalization of the hydrostatic pressures in adjacent compartments.

The most suitable material to be used for making the container walls is aluminum or an aluminum alloy. Other nonferrous materials such as copper alloys can also be used, especially austenitic or ferritic nickel steels. Weldable plastics that retain their strength at low temperatures can also be used.

Since in view of the outer insulation of such double walled containers, their walls will be everywhere at about the same temperature and will not be subjected to serious stresses. Whatever expansion or contraction does occur is taken care of by suitable bracing of the container walls against the walls of the ship or transport vehicle.

The technical advance that is made by this invention consists of greater protection of the container against tears or ruptures with resulting leaks, and also against mechanical injury. If the inner lining develops a leak, the cells inside the hollow walls may become filled, but with the outer wall still intact, it may be possible to make delivery at the final destination, or it may be possible to pump the liquid into another container and then make repairs. If the outer wall is damaged then similar measures can be taken.

Another advantage of this construction is that it renders unnecessary any additional shielding, e.g. of sheet metal, between the container and the walls of the ship to prevent liquid that has leaked out of the container from getting to the walls of the ship.

FIGURES 1 to 8 show a few of the preferred forms of construction for this invention;

FIGURE 1 is a perspective view, partly broken away, of a container built according to this invention;

FIGURE 2 shows a fragmentary detail in perspective of a lower corner of the container;

FIGURE 3 shows an extruded beam used in the construction of the container;

FIGURE 4 shows in perspective a portion of a double wall with an interposed sheet of zigzag cross-section;

FIGURE 5 shows in perspective a double wall with an interposed layer of corrugated sheet metal.

FIGURE 6 shows in perspective a three-layer wall with interposed layers of corrugated sheet metal;

FIGURE 7 shows in perspective a cross-section through a rounded lower corner of a container; and FIGURE 8 shows a plan view in horizontal cross-section of a lower corner of a container.

Figure 1:
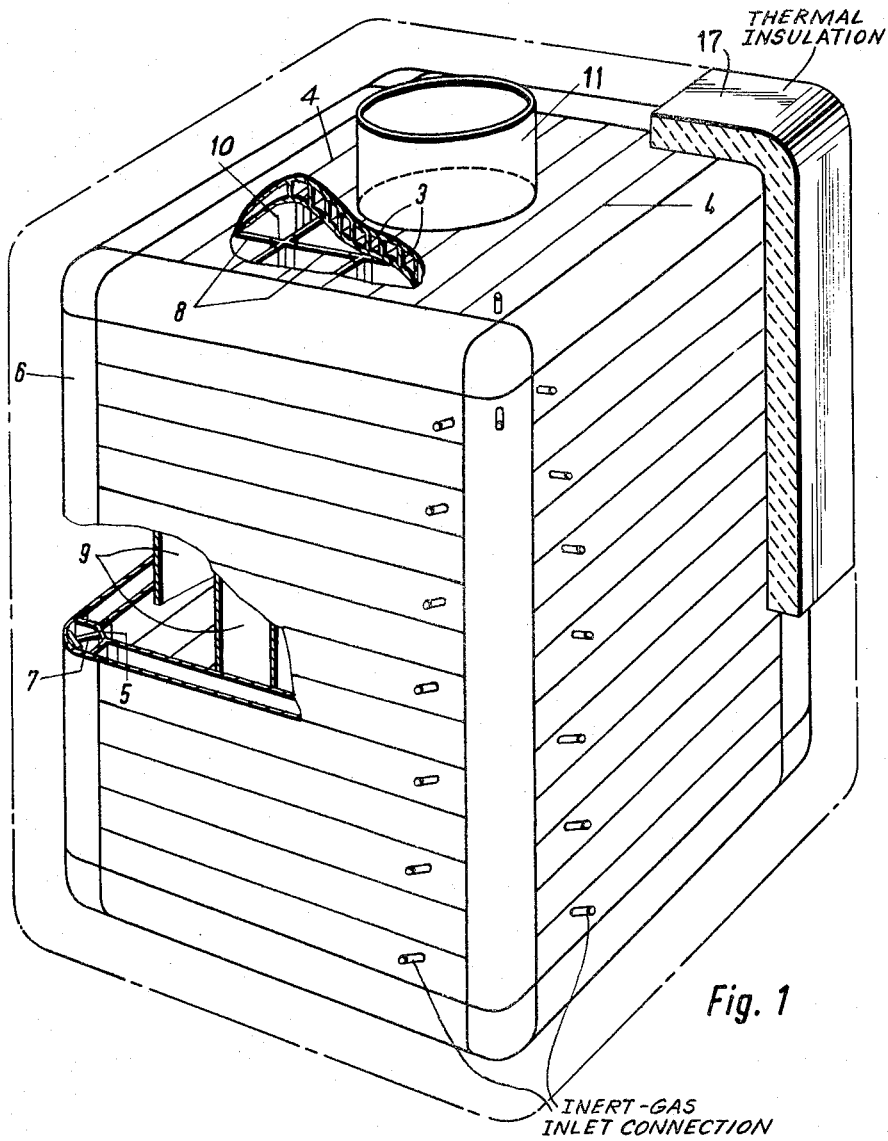

The double walls of the storage container 1 in FIGURE 1 are formed of extruded pieces 2 having a pair of webs 3, the pieces being welded to each other along their adjacent edges 4. The container is encased in insulating material 17. As shown in FIGURE 2, the edges of adjacent inner side walls and also the adjacent edges of an inner side wall and the inner bottom wall are joined to each other by metal strips 5 bent through 45° along a pair of parallel lines. The edges of adjacent outer walls are joined by metal strips 6 with rounded right-angle bends. These two strips are joined to each other by a web 7. The container 1 is traversed by walls 8 in the transverse direction and by walls 9 in the longitudinal direction. Along their intersections the walls 8 and 9 are joined by cross-shaped strips 10.

The dome 11 of the container can be formed of a single layer of sheet metal. The inert-gas inlet connections for each cell are shown at 19.

Figure 7:
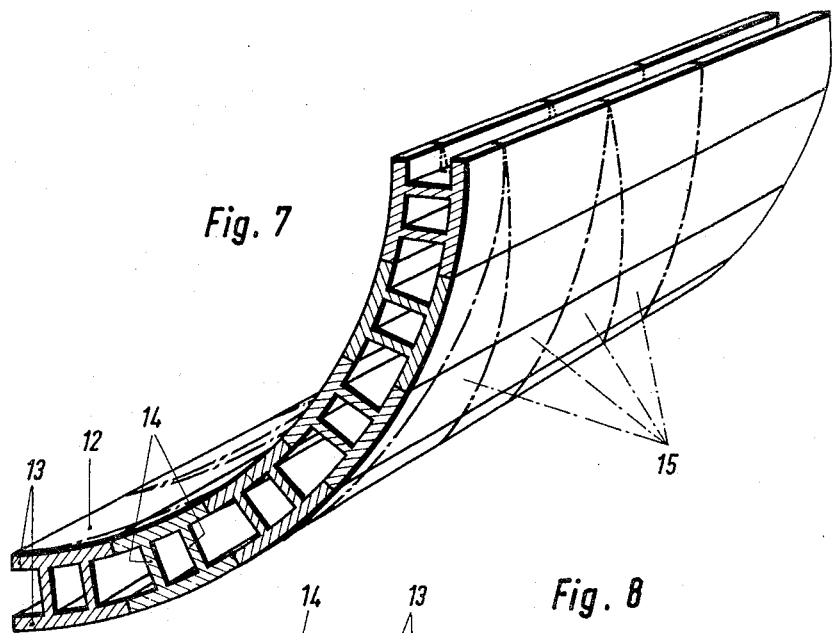

FIGURE 7 shows in perspective a fragmentary cross-section of a rounded lower corner of a modified container, the rounded portion being formed of extruded bars of hollow prismatic cross-section with radial webs 14 and flanges 13 of suitable dimensions to produce polygonal cells when welded to each other.

Figure 8:
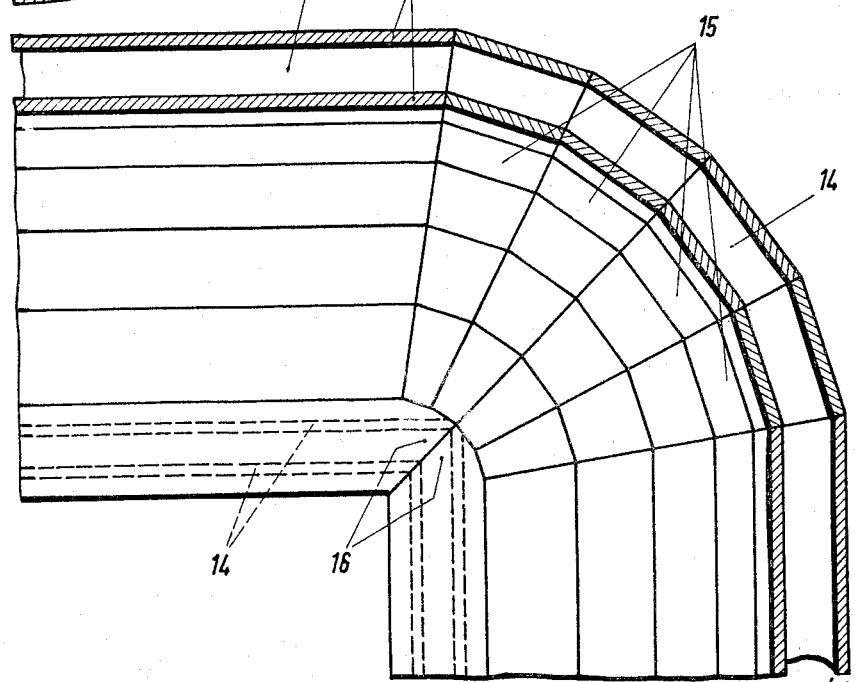

FIGURE 8 shows an approximately quarter spherical lower corner of the container formed of radial sections 15 and 16 that have been cut from the ends of the rounded lower corners of the containers as indicated by dash-and-dot lines in FIGURE 7.

The invention has been described, and preferred embodiments thereof illustrated in the drawings whereby those skilled in the art will readily understand the same. It will be also understood that further modifications and uses can be made of my invention without departing from the spirit and scope thereof, and as more particularly set forth in the appended claims.

What is claimed is:
1. A receptacle for the transportation and storage of low-boiling-point liquefied gases including methane and the like, comprising:
   a unitary liquid-tight container of generally prismatic configuration having a plurality of walls each constituted of at least two spaced-apart parallel metallic wall members, and a plurality of metallic webs rigidly secured to said members and spanning the space between them while subdividing said space into a multiplicity of individual fluid-tight cells collectively extending over substantially all of the walls of said container;
   a respective pipe connection communicating with each of said cells for introducing an inert gas into each of said cells; and
   a layer of thermally insulating material overlying the outermost one of said wall members of each of said walls for preventing the transfer of heat to said walls and by said walls to the contents of said unitary container.

2. A receptacle as defined in claim 1 wherein said walls are each composed of a plurality of extruded metal bars having longitudinally contiguous flange portions welded together to form said wall members and webs interconnecting said flange portions for defining said cells.

3. A receptacle as defined in claim 2 wherein said metal bars are each provided with a pair of webs spaced apart and connecting the respective flange portions and integral therewith whereby each of said bars defines a respective cell and further cells are defined between webs of adjacent bars.

4. A receptacle as defined in claim 1 wherein the spacing between said spaced-apart wall members of each of said walls ranges between substantially 20 and 300 mm.

5. A receptacle as defined in claim 1 wherein said metallic webs are constituted by a corrugated sheet welded to said wall members.

6. A receptacle as defined in claim 1 wherein said container further comprises a plurality of edge sections interconnecting said walls, each of said edge sections having an inner member flush with the inner one of the wall members of the respective walls and an outer member spaced from said inner member and flush with the outermost one of the wall members of the respective wall, and further webs interconnecting said inner and outer members.

7. A receptacle as defined in claim 6 wherein said outer members are cylindrically convex and said inner members are generally planar, said container further comprising generally spherical corner sections interconnecting said edge sections and contiguous therewith.

8. A receptacle as defined in claim 1 wherein said container further comprises two mutually orthogonal arrays of spaced-apart metallic partitions spanning the interior of the container, the partitions of one of said arrays interconnecting a first pair of opposing walls and the partitions of the other array interconnecting a second pair of opposing walls.

References Cited by the Examiner

UNITED STATES PATENTS

| | | | |
|---|---|---|---|
| 1,462,347 | 7/1923 | Kramer | 220—22 |
| 1,809,929 | 6/1931 | Farmer | 220—9 |
| 1,927,255 | 9/1933 | Brown | 220—15 |
| 1,950,234 | 3/1934 | Ewertz | 220—9 |
| 2,630,236 | 3/1953 | Arkoosh | 220—9 |
| 2,963,191 | 12/1960 | Setzekorn | 220—1 |
| 3,066,822 | 12/1962 | Watter | 220—15 |
| 3,073,476 | 1/1963 | Heacock | 220—83 |
| 3,103,885 | 9/1963 | McLauchlan | 220—15 |
| 3,167,204 | 1/1965 | Rouse | 220—15 |

FOREIGN PATENTS 24,959    12/1900    Great Britain.

LOUIS G. MANCENE, *Primary Examiner.*

GEORGE E. LOWRANCE, *Examiner.*